United States Patent

Langen et al.

Patent Number: 5,292,081
Date of Patent: Mar. 8, 1994

[54] TEXTILE YARN SPINNING APPARATUS

[75] Inventors: Manfred Langen; Thomas Lücke, both of Mönchengladbach, Fed. Rep. of Germany

[73] Assignee: Barmag AG, Remscheid, Fed. Rep. of Germany

[21] Appl. No.: 945,114

[22] Filed: Sep. 14, 1992

[30] Foreign Application Priority Data

Sep. 12, 1991 [DE] Fed. Rep. of Germany ....... 4130300

[51] Int. Cl.⁵ .......................................... B65H 67/06
[52] U.S. Cl. .......................................... 242/35.5 A
[58] Field of Search .................... 242/35.5 A; 57/266, 57/268, 270

[56] References Cited

U.S. PATENT DOCUMENTS

| | | | |
|---|---|---|---|
| RE. 31,839 | 2/1985 | Schippers et al. | 242/35.5 A |
| 3,987,974 | 10/1976 | Mayer | 242/35.5 A |
| 3,995,725 | 12/1976 | Howell, Jr. | 104/200 |
| 4,023,743 | 5/1977 | Schippers | 242/35.5 A |
| 4,340,187 | 7/1982 | Schippers et al. | 242/35.5 A |
| 4,351,494 | 9/1982 | Schippers, et al. | 242/35.5 A |
| 4,515,328 | 5/1985 | Payne, Jr. | 242/131 |
| 4,621,778 | 11/1986 | Paravella et al. | 242/35.5 A |
| 4,998,857 | 3/1991 | Paravella et al. | 414/331 |

FOREIGN PATENT DOCUMENTS

| | | |
|---|---|---|
| 0478164A1 | 4/1992 | European Pat. Off. |
| 0486039 | 5/1992 | European Pat. Off. |
| 4013066 | 10/1990 | Fed. Rep. of Germany |
| 1399891 | 2/1975 | United Kingdom |
| 2236768A | 4/1991 | United Kingdom |

OTHER PUBLICATIONS

"Melliand Textilberichte", Jul. 1985, pp. 499–503.

*Primary Examiner*—Stanley N. Gilreath
*Attorney, Agent, or Firm*—Bell, Seltzer, Park & Gibson

[57] ABSTRACT

A textile yarn spinning apparatus is disclosed for continuously producing a plurality of synthetic filament yarns, and wherein a plurality of winding machines are arranged in rows along a service aisle. A doffer travels along the service aisle from winding machine to winding machine, and the doffer receives at each serviced winding machine the full packages from the winding spindle and delivers the packages to a transport carriage. The transport carriage delivers the full packages to a temporary package storage area composed of highrise creels arranged in rows, and they are later delivered from the storage area to a further processing station where they are manually inspected and packaged for shipment. The temporary package storage area permits continuous operation of the apparatus over a twenty four hour period, with the manual inspection and packaging being conducted during a normal eight hour work shift.

22 Claims, 5 Drawing Sheets

TEXTILE YARN SPINNING APPARATUS

BACKGROUND OF THE INVENTION

The present invention relates to a textile yarn processing apparatus, such as a spinning plant, for the continuous production of a plurality of synthetic filament yarns.

DE OS 29 39 675 and corresponding U.S. Pat. No. Re 31,839 disclose a package doffing device for such a spinning installation, in which a yarn servicing carriage moves in the service aisle from one takeup machine to another. The yarn servicing carriage is operatively linked with a package doffing carriage. To do so, at each contacted and serviced takeup machine, the full packages are removed from the winding spindle and transferred to the package doffing carriage, which then delivers the packages to a package transport device. The package transport device receives a plurality of packages, which it then transports to a control station for the individual packages. Thereafter, the full packages having been found to be satisfactory, advance to a packing station.

The operative linkage of yarn service carriage and package doffing carriage leads to a refill of the package transport device in defined time intervals, which determines the operating cycle of the package control station. The operating cycle of the control station is thus dependent on the refill speed of the package transport devices.

In this known installation, it is necessary to have at least one package transport device available for receiving new full packages. It is also necessary to have a large floor space. Furthermore, this installation is subject to a rigid time sequence in the production of full packages, since ultimately the time intervals necessary for refilling the package transport devices determine the production speed. A lengthening of the time intervals can be realized only by enlarging the package transport devices or by increasing their number. However, in view of the number of full packages to be received, limits are set to the first of the two measures due the high package weights which are presently being produced, since otherwise it would no longer be possible to handle the package transport devices. The second of the two measures necessitates an increased floor space requirement.

As used in the present application, a doffer is understood to be an apparatus traveling along a machine front from takeup machine to takeup machine, which doffs the produced full packages at the end of a winding cycle. This doffing operation includes the removal of full packages from each serviced winding spindle and the transfer of these full packages to a transport carriage for further transportation.

The time of removing the produced full packages is monitored by the doffer, it being useful that the doffer also requests the respectively needed number of empty tubes.

In one embodiment, the doffer is additionally designed to furnish the just-serviced winding spindle with new empty tubes after removing and transferring the full packages, so that the takeup machine is able to continue its winding operation. Such a doffer is known, for example, from DE AS 24 49 415. In the case of this doffer, the necessary number of needed empty tubes is continuously furnished by means of a conveyor chain passing by the doffer.

Also known from DE OS 21 28 974, is a package doffing carriage which replaces full packages with empty tubes. In this embodiment, the empty tubes are carried along on the package doffing carriage and transferred to the winding spindle of the takeup machine by means of two gripping arms.

DE OS 21 23 689 also discloses a traveling package doffer, which delivers the full packages to a traveling package transport device. Subsequently, the package transport device is moved to a control station, where the individual full packages are subjected either individually or randomly to a quality check, and then continue to a packing station.

In light of this prior art, it is the object of this invention to create a yarn processing apparatus, such as a spinning plant for the uninterrupted production of a plurality of synthetic filament yarns, and which overcomes with little floor space requirement the incompatible different time cycles of the production and winding facilities on the one hand, and of the further processing stations, such as, for example, individual package control and packing, on the other hand. Thus the time cycles involved with the production of full packages are independent of the time cycles involved with individual

SUMMARY OF THE INVENTION

The above and other objects and advantages of the present invention are achieved in the embodiment illustrated herein by the provision of a textile yarn spinning apparatus which comprises a package winding means comprising a plurality of yarn winding machines arranged in parallel rows to define a service aisle therebetween. Package storage means is provided which comprises a plurality of creels of substantial height and which are arranged parallel to each other to define a storage aisle therebetween, and with each creel having a plurality of storage mandrels arranged side by side in vertically spaced apart horizontal rows, and with the mandrels projecting toward said storage aisle. A servicing device is movable along the storage aisle for delivering full packages to selected mandrels of a selected creel and for removing the same from such creels, and package processing means is provided which comprises a receiving area positioned adjacent one of the ends of the storage aisle of the storage means, and a processing station spaced from the receiving area. A doffer is adapted to move along the service aisle of the winding means for removing full packages from the winding machines and replacing the same with empty yarn winding tubes, and a transport carriage is movable along a path of travel which includes the service aisle of the winding means and extends to a location adjacent one of the ends of the storage aisle of the storage means. The transport carriage includes transport mandrel means for receiving at least one full package from the doffer and delivering the same to the servicing device of the storage means and for receiving at least one empty winding tube on its travel back to the service aisle and delivering the same to the doffer. The package processing means further comprises conveyor means for receiving full packages from the servicing device of the storage means at the receiving area of the processing means and conveying the same to the processing station.

The invention as described above provides the advantage that the spinning installation is able to produce fully automatically in a three-shift operation, while operating the further processing stations, such as the individual package control station and the packing station, only in a one shift operation.

The invention has recognized that it is necessary to bypass bottle necks in the production sequence of synthetic fibers. Such a bottle neck is, for example, the individual package control station which must be occupied by a plurality of auxiliary personnel. While the plurality of winding takeup machines operates fully automatically, the individual package control must proceed essentially by hand. The present invention is able to keep the personnel cost necessary therefor as low as possible. More particularly, the full packages which are produced in a three-shift operation, and also during weekends, are held in temporary package storage until they can be transported individually from the temporary package storage to the further processing stations, for example, the individual package control, so as to advance from there, if their quality has been found to be satisfactory, to the packing station.

The individually movable transport carriages are adapted to travel independently of each other, and form a transport system which is always available to service the winding heads. This results in a flexible servicing in accordance with the respective need of the individual winding spindles of the winding takeup machines. The waiting times for doffing full packages at the end of a winding cycle are therefore short. Consequently, it is possible to achieve a high degree of utilization for the winding machines. Furthermore, the individually movable transport carriages permit a delivery to the temporary package storage at any time.

In accordance with the invention, the temporary package storage is designed and constructed as a high-rise creel, which offers the advantage of a high storage capacity with little requirement for surface area or space. It is possible to increase the packing density of the temporarily stored full packages by arranging the storage mandrels of each high-rise creel on the individual levels at a common gauge from one another and such that the storage mandrels of one level and the storage mandrels of an adjacent level are offset from one another by half the common gauge.

It is useful to arrange the high-rise creels such that they have a number of storage aisles identical to the number of service aisles. Furthermore, one service aisle between the columns of winding machines is invariably associated to each individual storage aisle between the high-rise creels. The number of levels formed in the high-rise creels which show to one of the storage aisles is equal to the number of takeup machines of the associated service aisle, with an established sequence of winding machines also corresponding to an established sequence of levels of the high-rise creels. It is further proposed that the juxtaposed mandrels of each level receive the full packages in the same sequence.

The above measures permit a determination, in a simple manner and at any time, which full package was produced by a particular machine at a specific time.

It should be noted that the above is not the only association of the full packages delivered to the temporary package storage to the winding machine of production. To this end, a further possible embodiment will be described.

Both the storage of full packages and their delivery from the storage are handled by the servicing device which is provided in each of the storage aisles. To this end, the servicing device, on the one hand receives the full packages delivered by the transport carriage and inserts the same onto the storage mandrels. On the other hand, irrespective of the delivery into the storage, the servicing device takes the full packages and transports the same to individual conveyors which arrive and leave irrespective of the transport carriages. The servicing device preferably includes a pair of transport mandrels, and an elevator for lifting the mandrels to a selected height and for rotating the mandrels about a vertical axis.

In a preferred embodiment, the yarn winding machines are arranged to define a plurality of service aisles, and each service aisle includes a separate doffer and a separate transport carriage track, with the separate tracks being disposed at different elevations adjacent the package storage. This feature provides the advantage that a space-saving arrangement of the rows of winding machines is possible, and that nonetheless it is possible to utilize the advantages of the invention. Depending on the available floor space, it is possible to arrange the several service aisles of the individual rows of winding machines in a parallel, perpendicular, or star-shaped relationship to one another. While the conveying tracks in the individual service aisles extend at heights which are substantially identical and predetermined by the working heights of the doffers, the individual conveying tracks include on their path from their service aisle to the temporary storage a length which brings them to their respective conveying height at the temporary storage. On their way from the temporary storage back to the service aisle, they include again a length which returns the transport carriages to their conveying height in the service aisles. This further development of the invention utilizes the knowledge that the elevators which are anyway needed to store the full packages in the high-rise creels and to remove them therefrom, can be designed without any further measures such that they are able to handle the removal of full packages from the transport carriages at any different conveying height.

The conveying tracks may be arranged as a closed loop, which provides a further advantage of a circulating operation of the transport carriages, so that it is unnecessary to provide side tracks for oncoming transport carriages.

The return track segment which leads from the package storage back to the service aisle, preferably passes a magazine filled with empty winding tubes, and which loads each transport carriage with the empty tubes required for a winding spindle of a winding machine. Thus each transport carriage has a renewed loading capacity after having delivered the full packages to the temporary package storage. In this simple manner, it becomes possible to make empty tubes available immediately to the respectively serviced winding machine when the full packages are doffed. A further advantage is that it is possible to provide the empty tubes which are taken from a certain empty tube magazine, with markings, so as to be able to utilize this information, if need be, in the quality control as well as in subsequent processing or treating stages.

The closed loop formed by each conveyor track preferably includes a forward track segment leading from the winding machines to the package storage, and a return track segment leading from the package storage to the winding machines. Also, the forward track segment has a U-shaped portion along the associated service aisle and the return track segment extends as a cul-de-sac along the service aisle. This construction presents a further advantage in that it allows to store the transport carriages along the return track segment. This advantage results in that, in case of need, it is possible to send, immediately upon request, a transport carriage on a short distance and, thus, with little loss of time to the winding machine to be serviced.

The return track segment and the forward track segment may be interconnected by alternately arranged turning switches and parallel switches, which permit the travel distances and travel time to be further shortened.

By designing the conveying tracks and carriages as an overhead conveying system, the floor of the service aisle between the columns of takeup machines remains free for walking.

The conveyor means of the package processing means preferably comprises a forward conveying track leading from the receiving area of the processing means to the processing station, and a return conveying track leading from the processing station back to the receiving area. Also, individual transport platforms are mounted so as to be movable along the forward and return conveying tracks. This permits an uninterrupted operation while performing the individual control and packing of the full packages, without the individual conveyor platforms impeding one another, or without it being necessary to bypass oncoming individual conveyor platforms.

The conveyor means of the package processing means may also have a by-pass loop, to ensure that sufficient individual conveyor platforms are respectively available for loading with full packages.

In one specific embodiment, the individual conveyor platforms are constructed as transport platforms, which travel along a roller track, so that it is unnecessary to provide a separate drive for the individual conveyor platforms.

The conveyor platforms are each designed to be movable to a stopped position aligned with an associated storage aisle of the package storage, with the full packages being transferred thereto by the servicing device. Also, each conveyor platform may be provided with a single transport mandrel, which is directed horizontally toward the storage aisle. Thus a further device to deliver the full packages to the individual conveyor platforms is not needed, since the invention avails itself of the knowledge that the servicing device of the package storage is not fully utilized. On the other hand, the horizontally projecting transport mandrel of the individual conveyor platform has the advantage that the full packages are transported with their axes extending horizontally both by the transport carriages on their way from the winding machine, via the doffer, to the temporary storage and by the individual conveyor platforms, via the package control station, to the packing station. It has been shown that this measure effectively prevents a dropping of the yarns ends. Only in the packing station does it become necessary to turn the packages for better loading on pallets, which is offered by the use of a platform rotation device as further described below.

It is possible to pivot the transport mandrels of the conveyor platforms in two ways. Either the conveyor platforms are provided with stationary mandrels and are turned by 90° during their advance together with their mandrels, or the mandrels are pivotally arranged on the conveyor platforms.

The winding spindle of each winding machine preferably receives an even number of winding tubes. Also, the mandrels of the transport carriages, the mandrels of the servicing devices in the storage aisles, and the storage mandrels of the high-rise creel, are all provided in pairs. Thus each individual transport mandrel or storage mandrel is designed to receive half the number of packages from a winding spindle. Further, the pairs are uniformly spaced by a common gauge. These features permit the distances of the service aisles to be very small between rows of takeup machines, and also the distances of the storage aisles between the high-rise creels to be small. During transportation, the mandrels of the transport carriages project horizontally into the service aisle so that they each point in the direction of the winding machine front. The paired arrangement of the transport mandrels ensures that the projecting length can be halved. As a result, it is possible to move the rows of takeup machines closer together, so that less floor space is needed. Due to this arrangement which continues to the high-rise creel storage, a clear association of the produced full packages to the respective winding machine remains intact with the least floor space requirement. Furthermore, the transport carriages and the servicing devices need not be designed for heavy loads, so as to avoid a tipping due to overweight.

As aforesaid, the transport carriages are loaded with full packages by means of doffers. This can be realized in two ways.

If the doffer has one work arm which is designed to receive the total number of full packages from one winding spindle, it will be necessary to effect the transfer of the full packages to the pairs of mandrels of the transport carriages in two steps:

After the transport carriage is moved to the corresponding position, the first half of the available full packages is pushed first by the doffer onto one of the paired mandrels of the transport carriage. Subsequently, the latter advances relative to the work arm of the doffer by the transport gauge. Then, the second half of the full packages is pushed onto the second of the paired mandrels of the transport carriage, and the transfer procedure is completed.

However, if the doffer is provided with two work arms which each receive half the number of the packages from one winding spindle, and which are spaced at the transport gauge, it will be possible to perform the transfer of the produced full packages from the doffer to the transport carriage in a single step: After the transport carriage is moved in position, all packages are simultaneously pushed by the pair of work arms of the doffer onto the pair of mandrels of the transport carriage, and the doffer is thus available to service the next winding machine in less than half the time needed for the first embodiment.

The storage creels are preferably constructed such that the storage mandrels of vertically adjacent rows of mandrels are offset by one half the spacing between adjacent mandrels, i.e. by the common gauge. This permits a particularly great packing density in the temporary storage without preventing the clear association of the full packages to the individual winding machines.

If desired, an area of a high-rise creel may be reserved to store full packages which have been rejected at a control station for quality reasons. The conveyor platforms containing these rejected packages may by-pass the processing station by means of a by-pass conveyor track. In the control station, inferior qualities are singled out. Such inferior qualities may still be sold, if need arises. However, it is necessary that a correspondingly large number of packages of inferior quality be available to enable a palletizing. By redirecting the packages of inferior quality, it becomes possible to accumulate correspondingly large numbers of packages in the temporary storage.

Each service aisle may be provided with an emergency elevator and an emergency service carriage. This ensures an uninterrupted operation also when a doffer fails. In this event, the packages are manually doffed onto the emergency service carriage. The latter is then raised by the elevator such that the produced full package can easily be delivered to the transport carriage.

It is useful to arrange the emergency elevator at the end of the U-shaped portion of the forward track proximate the temporary storage, since this simple measure permits the operation of the transport carriages to continue without impediment.

BRIEF DESCRIPTION OF THE DRAWINGS

Some of the objects and advantages of the present invention having been stated, others will appear as the description proceeds, when taken in conjunction with the accompanying drawings, in which.

BRIEF DESCRIPTION OF THE PREFERRED EMBODIMENTS

Figure 1:
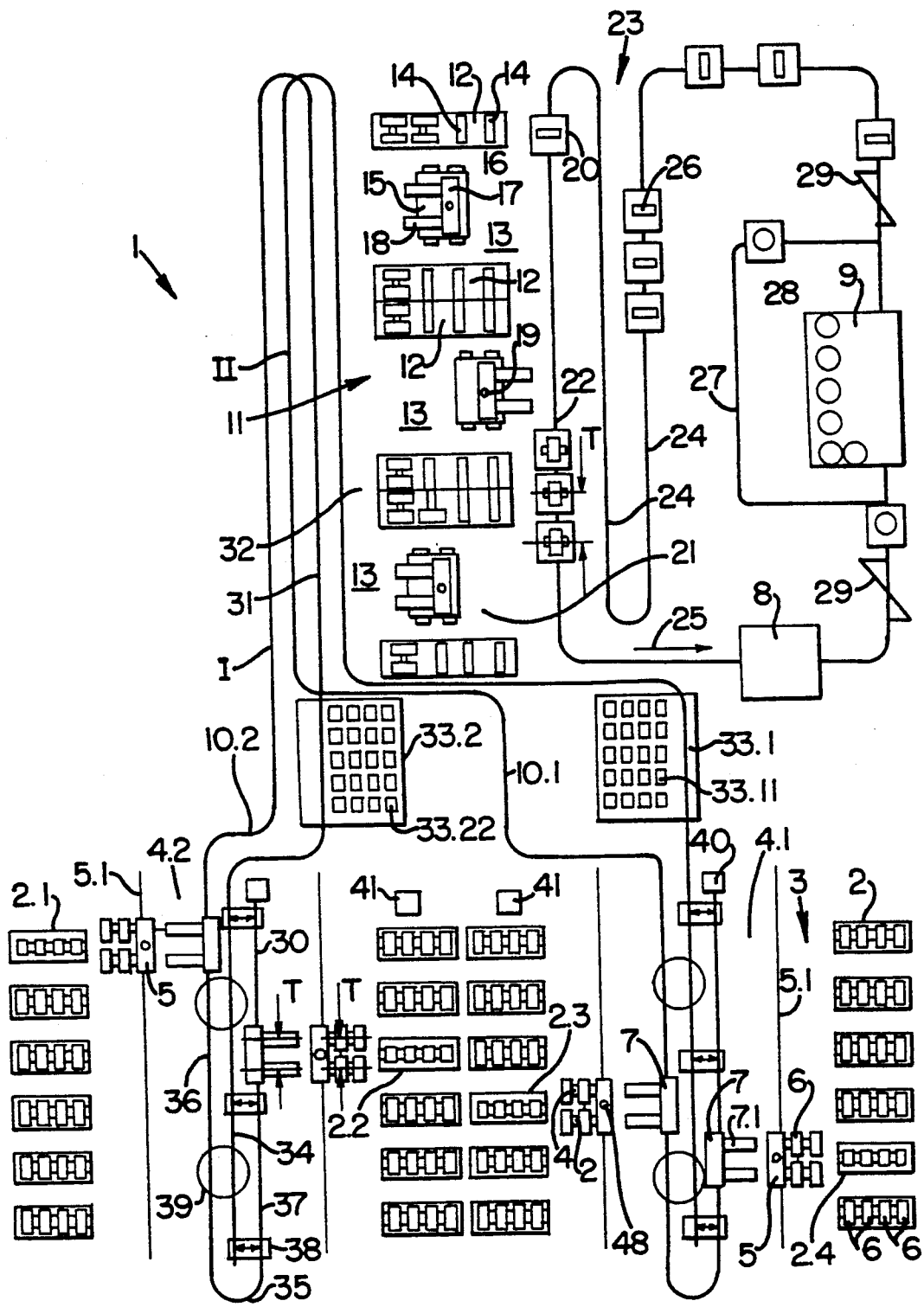
FIG. 1 is a schematic top plan view of a spinning plant in accordance with the present invention.
Figure 1A:
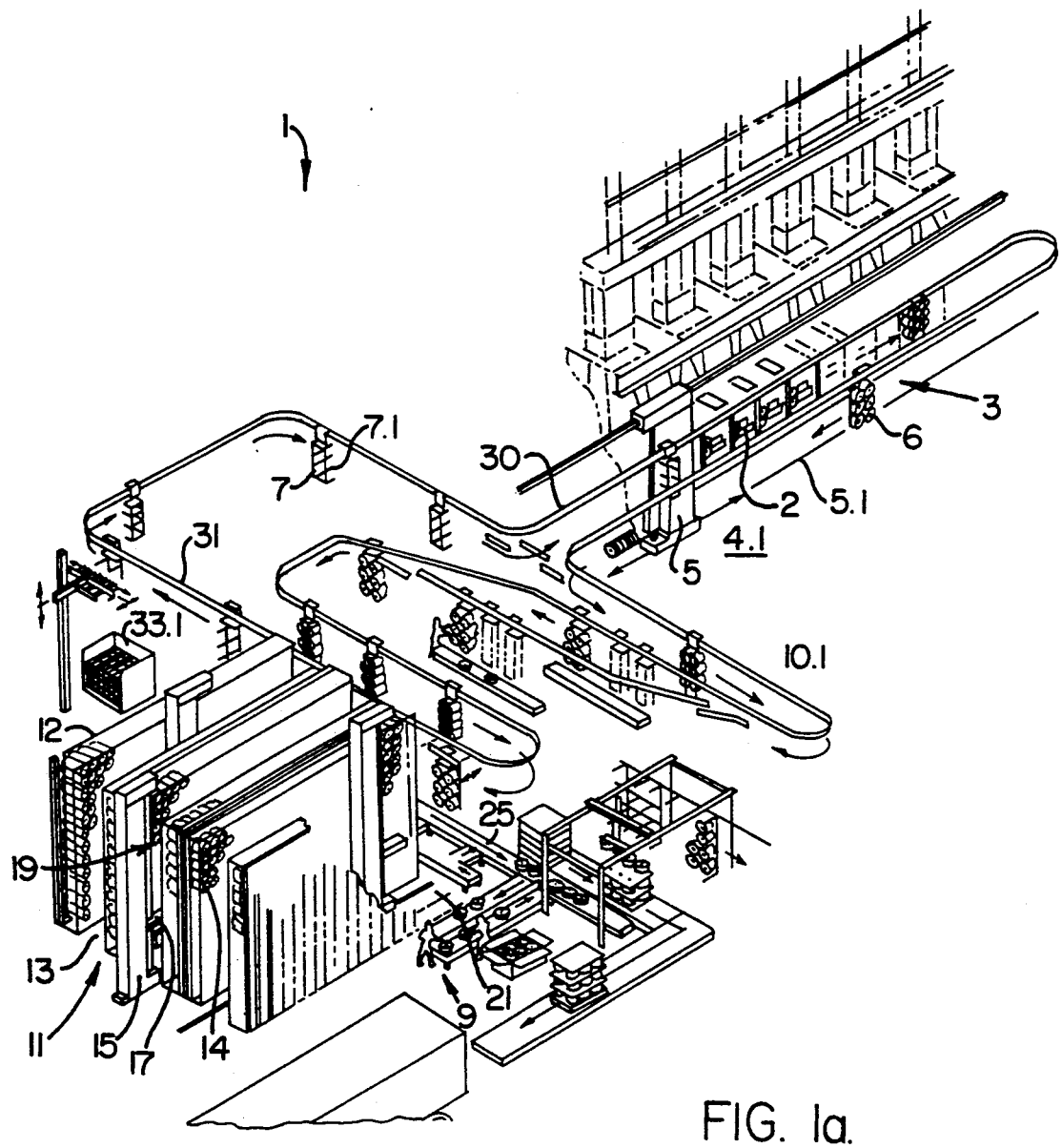
FIG. 1a is a perspective view of a further spinning plant in accordance with the present invention.

Referring more particularly to FIGS. 1 and 1a, a spinning apparatus 1 in accordance with the present invention is illustrated, and which is adapted for an uninterrupted production of a plurality of synthetic filament yarns. The apparatus comprises a plurality of winding machines z which are arranged in rows 3 of winding machines along a service aisle 4.1, 4.2. Illustrated in FIG. 1 are two service aisles 4.1, 4.2 which are aligned parallel to one another. On each side of each of the service aisles, respectively one row of winding machines 3 is arranged parallel to service aisle 4.1, 4.2, with the winding spindles of the individual winding machines projecting perpendicularly into the service aisle.

In each of the service aisles, a doffer 5 is provided to travel along a track 5.1 such that the doffer 5 is able to move along track 5.1 from winding machine to winding machine. In the present embodiment, a separate doffer 5 is associated to each row of winding machines. However, it should be noted that it is also possible to have a single doffer travel along one doffer track in each service aisle, which passes by both columns of winding machines.

At each contacted and serviced winding machine 2.1, 2.2, 2.3, 2.4, the doffer receives full packages 6 from the winding spindle and delivers same to a transport carriage 7, which is for this purpose on standby at each contacted and serviced winding machine 2.1, 2.2, 2.3, 2.4, so as to take over the full packages. The full packages are transferred to the transport carriage by means of a mandrel 7.1, as will be described in more detail below.

Associated to each of service aisles 4.1, 4.2 is a conveying track 10.1, 10.2. A plurality of individually movable transport carriages 7 travel along each of the conveying tracks, with each individual transport carriage having its separate drive, and being adapted to stop independently of the other transport carriages.

The conveying tracks extend between the front sides of the winding machine rows and a temporary package storage 11 such that the transport carriages can travel forward and back along this path free of impediments.

To this end, each of the individual conveying tracks is designed as a closed loop, and comprises a forward track segment 30 from the service aisle 4.1, 4.2 to the temporary storage 11, and a return track segment 31 in the reverse direction, with one closed-loop track respectively extending in service aisle 4.1, 4.2, and thence to one of the front ends 32 of storage aisle 13 of the temporary storage 11.

As used in the present application, a forward track segment is described as that distance which the transport carriages loaded with full packages pertaining to a winding spindle cover until the transfer of the full packages to the temporary storage.

One characteristic is to be seen in that the return segment 31 of each conveying track 10.1, 10.2 passes by respectively one empty tube magazine 33.1, 33.2, where the mandrels 7.1 of the transport carriages 7 receive the empty tubes 33.11, 33.22 which are required by a winding spindle.

Another characteristic is that, as shown in FIG. 1, the return segment 31 of each of the closed-loop conveying tracks 10.1, 10.2 extends in the form of a cul-de-sac 34 along service aisle 4.1, 4.2, and that the forward segment has a U-shape in the service aisle, with a first branch 36 connected to temporary storage 11 extending along one of the two sides of the return track segment 31, and with a second branch 37 terminating at the end of service aisle 4.1, 4.2 which is proximate to the temporary storage 11, and extending on the other side of return track 31. At the end remote from the temporary storage 11, the first branch 36 and the second branch 37 are interconnected by a reversing loop 35, and further connected with the return track segment by means of switches.

To this end, the return track segment 31 is connected with the first branch 36 of forward track segment 30 by means of turning switches 39 which redirect the transport carriages 7 coming from the return track segment 31 onto the first branch 36 of forward track segment 30 while reversing the traveling direction. Further, the return track segment 31 is connected with the second branch 37 of forward track segment 30 by means of parallel switches 38 which redirect the transport carriage 7 advancing from the return track segment 31 onto the second branch 37 while maintaining the traveling directions.

When viewed in the traveling direction of the return track segment 31, a total of five switches are successively arranged, with turning switches and parallel switches alternating one another. Furthermore, the turning and parallel switches are arranged in close vicinity.

Such an arrangement of switches ensures that each of the transport carriages 7 need not always travel along the entire U-shaped path, when it is necessary to service one of the winding machines. Further, it is ensured that each of the transport carriages arrives on any possible track at a doffer always such that its projecting mandrels face the doffer in the correct receiving position.

The conveying tracks respectively associated to the service aisles are independent of one another, in that the conveying tracks 10.1, 10.2 extend in different heights I, II along the temporary storage. The conveying heights I, II are spaced from one another at such a large vertical distance that the individual transport carriages of the two conveying tracks are unable to contact each other.

The full packages received by the transport carriages are to be moved to a package processing area which includes a control station 8 for the individual packages, and then a packing station 9. Since the full packages are continuously produced on the winding machines, all transport carriages are employed in a twenty-four hour operation, and in accordance with the present invention, the full packages are conveyed from the winding machines to the stationary temporary storage 11 before proceeding to the package processing area.

The temporary storage 11 comprises several high-rise creels 12 which are arranged parallel to one another, and each pair of which forms a storage aisle 13 therebetween. Each of the high-rise creels is provided with a plurality of storage mandrels 14.

Figure 2:
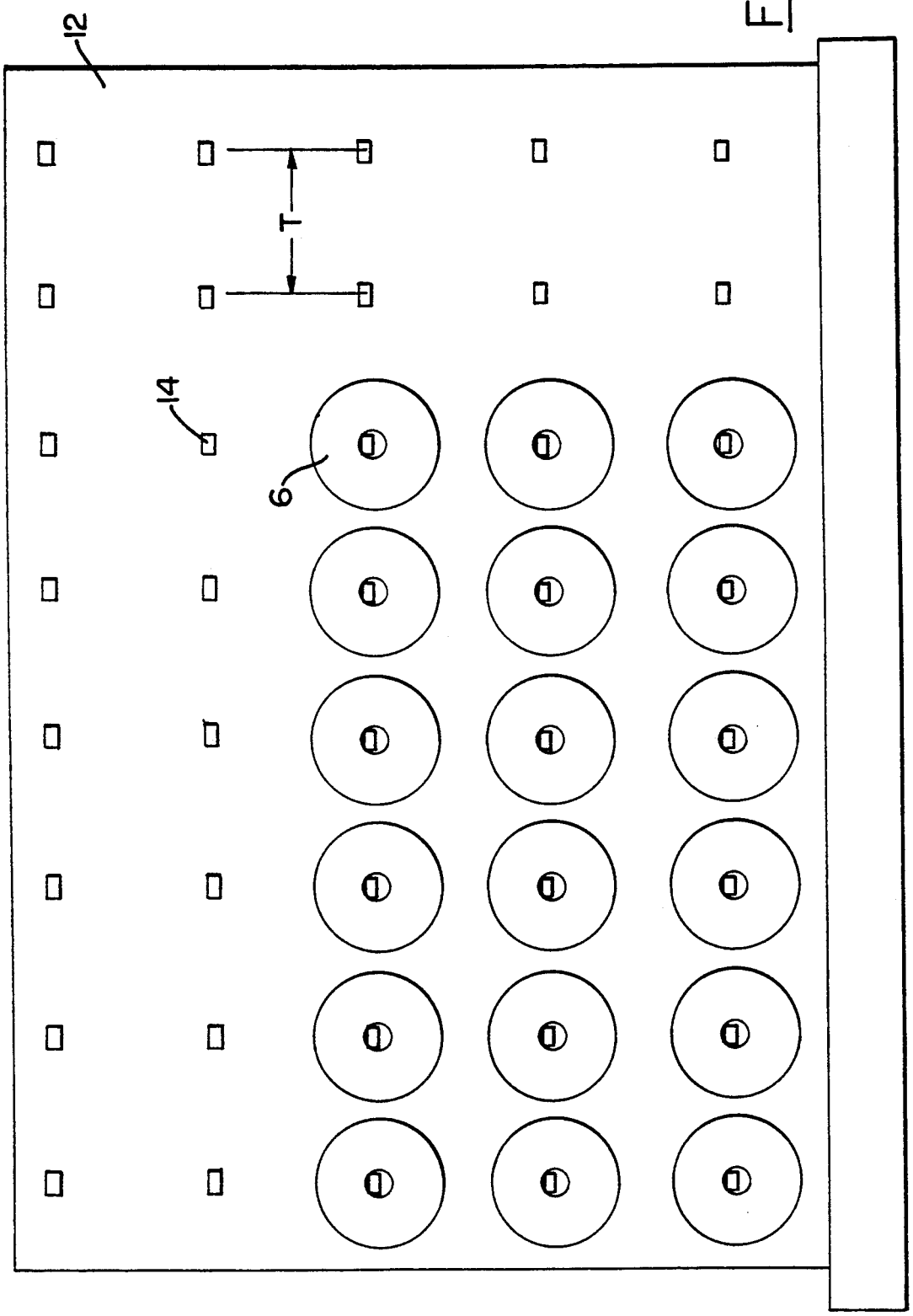
FIG. 2 is a side view of a temporary storage creel of the present invention.
Figure 3:
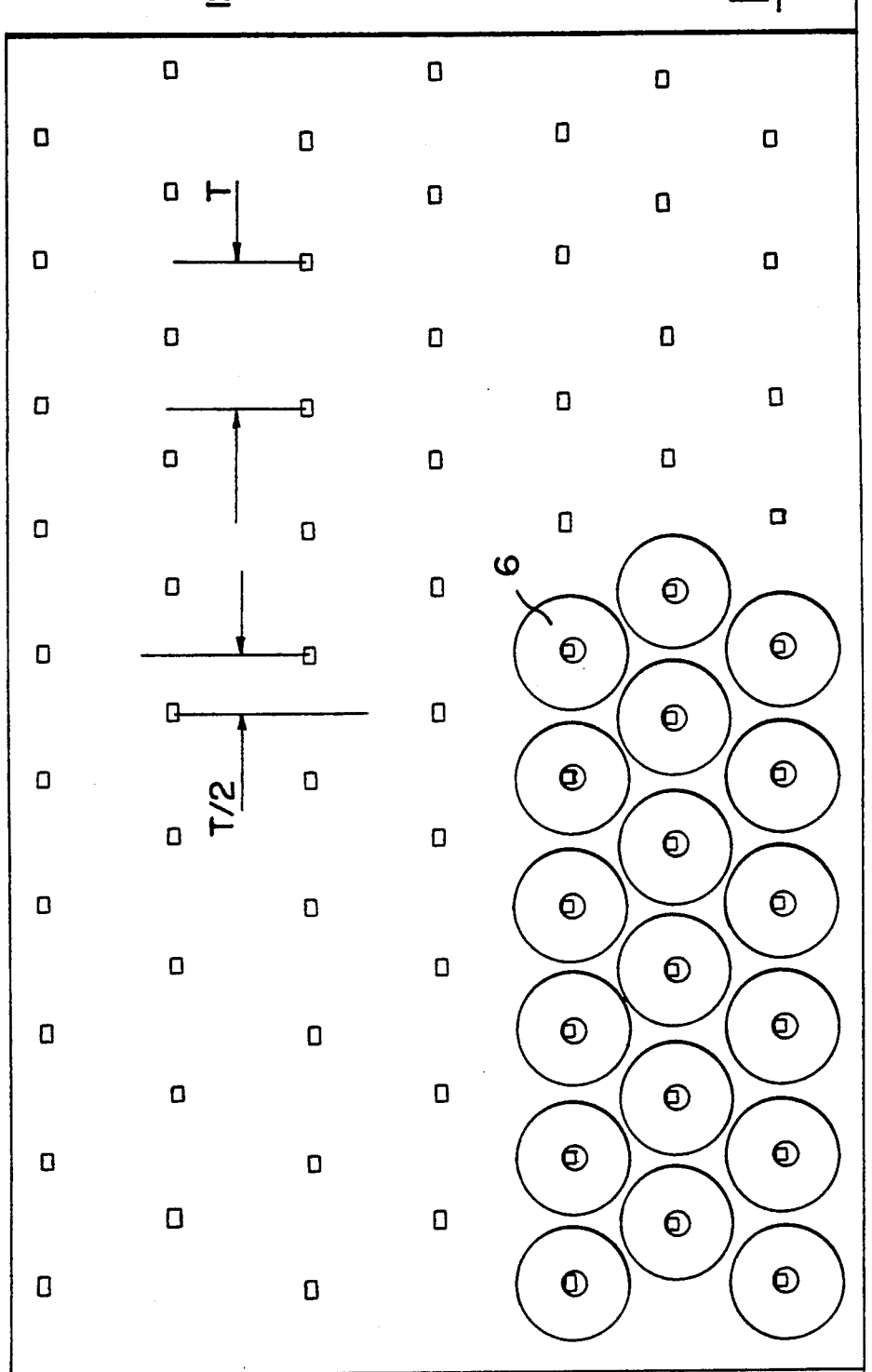
FIG. 3 is a side view of a temporary storage creel of the present invention with offset storage mandrels.

As shown in FIGS. 2 and 3, the storage mandrels 14 are juxtaposed and superposed in tiers, and project in the direction of storage aisle 13, note also FIG. 1. In each of the storage aisles, a servicing device 15 is provided for forward and backward movement between both ends 21 and 32 of the storage aisle.

Each servicing device is provided With a bottom platform which is equipped with wheels 16, and carries an elevator 17 with a pair of transport mandrels 18. The latter serve to receive the full packages delivered by a transport carriage and to transfer same to storage mandrels 14 of one of the high-rise creels, as well as to receive full packages of a winding spindle and to transfer same to individual conveyor platforms 20, as will be described in more detail below. In the case of the embodiment of FIG. 1a, the individual conveyor platforms 20 are positioned on a roller conveying track, along which the individual full packages, and travel from the temporary storage to the packing station 9, or from the temporary storage 11 to a further processing station, for example, to the package control station 8 or the packing station 9.

The pair of mandrels 18 on each servicing device 15 can be moved up and down by means of the elevator 17, the latter being rotatable about a vertical axis 19 such that a mandrel 18 of the servicing device 15 may be aligned with either a mandrel 7.1 of the transport carriage 7 or with a storage mandrel 14.

The servicing devices are preferably bipartite. A first part is movable along the storage aisle 13, and a second part is stationarily arranged respectively in front of the storage aisle. The stationary part is adapted for upward and downward movement between conveying heights I, II of the conveying tracks 10.1, 10.2, and is also rotatable by 180°. As a result, the delivered full packages are first received by the stationary part, and subsequently delivered to the movable part for temporary storage.

The individual conveyor platforms 20 transport the temporarily stored full packages during the shift operation of the control station s and the packing station 9. To this end, the individual conveyor platforms are adapted for movement between a receiving area adjacent one of the ends 21 of storage aisle 13 and control station 8 as well as packing station 9.

In the present embodiment, this occurs on a peripheral conveyor track 22, which includes a buffer storage track 23 extending in the form of parallel bypass loops 24 between the packing station 9 and the end 21 of storage aisles 13.

The individual conveyor platform travels along this transport track in direction 25, each individual conveyor platform 20 being adapted for movement to a stopped position in the receiving area adjacent the end 21 of storage aisles 13, in which the full packages are transferred by means of the servicing device 15.

To transfer the full packages, in the embodiment of FIG. 1 each individual conveyor platform 20 includes a mandrel 26 which points in each of the stopped positions with its free end horizontally into the storage aisle. In the intermediate of the three storage aisles, the elevator is pivoted in such a manner and moved to such a height that two transport mandrels 26 of two adjacent individual conveyor platforms 20 can be simultaneously serviced by the two mandrels 18 of the elevator, as will be described in more detail below.

Figure 4:
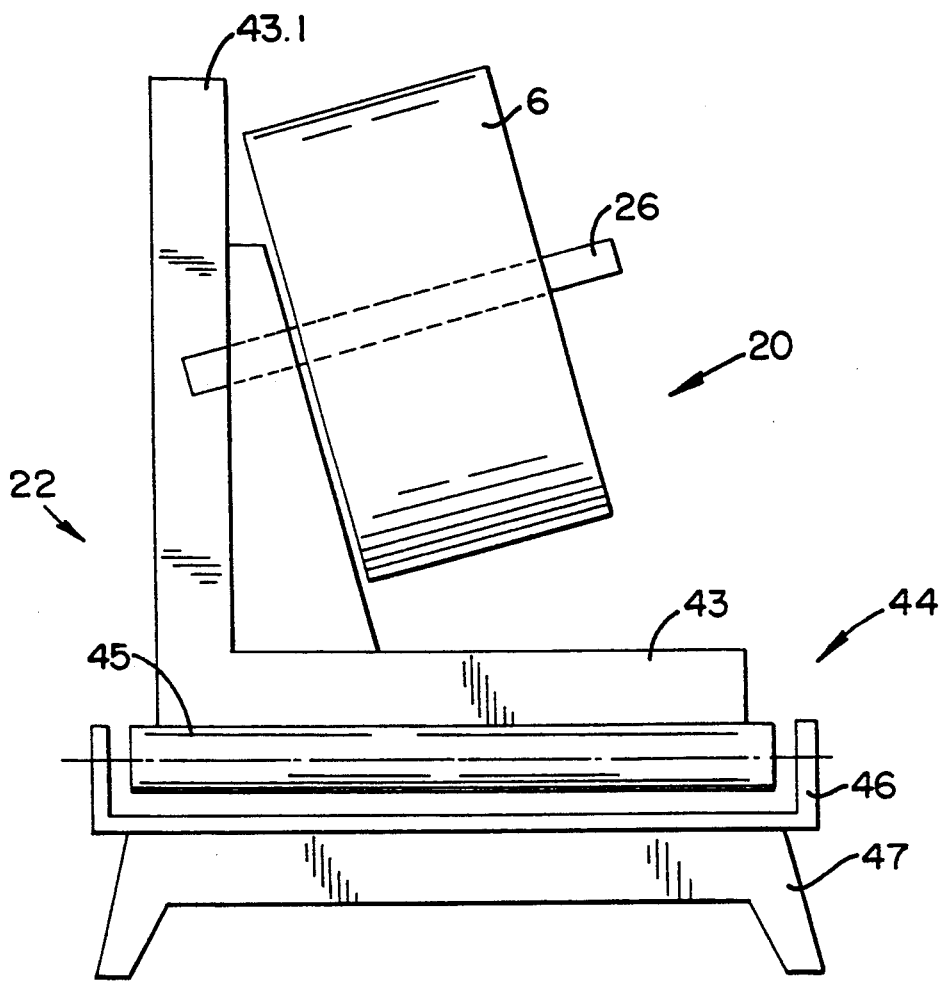
FIG. 4 is an end view of an individual conveyor platform on a roller track as used with the present invention.

As shown in FIG. 4, the peripheral conveyor track 22 consists of a roller track 44. The roller track 44 is formed by a plurality of individual rollers 45 which are rotatably supported on a bearing block 46. The bearing block 46 supports itself on the floor by means of a pedestal 47.

Each individual conveyor platform 20 consists of a L-shaped body member 43 which moves with its underside along the roller track. The member 43 is provided with a projecting mandrel 26 which carries in the illustration a full package 6.

As further shown in FIG. 4, the mandrels 26 of the individual conveyor platforms 20 project in horizontal direction. Thus, the packages lie horizontally during their transportation. However, the packing usually is to be done with vertically extending packages. To this end, it is necessary to rotate the packages by 90°. For this purpose, the embodiment of FIG. 1 is provided with a turning device 29 preceding the packing station 9, which rotates the conveyor platforms by 90°, as they pass thereover. Thereafter, the full packages which are shown as circles in this rotated view, advance to the packing station to be palletized. Behind the packing station 9, an inversely acting turning device 29 reverses the rotation by 90°.

The conveyor platform is provided with back side 43.1 which is arranged with respect to its base at a right angle, and which is upright during the travel of the individual conveyor platform 20 from the temporary storage to the control station and to the packing station. The conveyor platform is rotated anticlockwise from the position shown in FIG. 4, with the back side 43.1 being simultaneously supported by an engaging roller track (not shown) such that a continuous anticlockwise turning of the transport platform by 90° proceeds during its movement along the roller track. As soon as the conveyor platform 20 moves along the now engaging roller track (not shown), the illustrated roller track 44 terminates.

The reverse rotation of the conveyor platform occurs in the same manner in a clockwise direction.

Since an area of the temporary storage may be reserved to temporarily store packages 28 which were singled out in the control station 8 because of inferior quality, a track 27 bypassing packing station 9 is provided behind the control station 8 to return the packages 28 singled out because of inferior quality.

An elevator 40 and an emergency service carriage 41 may be provided in each of the service aisles 4.1, 4.2. The former allows packages to be lifted which in an emergency have been loaded by hand on the emergency service carriage, to the level of the transport carriage 7.

In the illustrated embodiment, the emergency elevator is arranged at the end of the second branch of the forward track segment, which faces the temporary storage, so that the emergency elevator is unable to interfere with the continuous operation of the transport carriages.

As shown in FIG. 2, the full packages 6 are stored in a high-rise creel 12, for example, in five levels on top of one another and in eight Vertical rows side by side. The storage mandrels 14 are spaced from one another by the distance T, and the rows of storage mandrels of two adjacent levels are arranged such that the mandrels are vertically aligned.

To ensure that the individual storage positions are associated to the individual takeup machines, the following space allotment is selected:

According to the number of winding machines in each row (for example, five), the high-rise creel has five levels, so that one level is clearly assigned to each winding machine.

In each individual level, starting from the left, the full packages 6 respectively produced by a specific takeup machine are temporarily stored one after the other without a gap therebetween.

FIG. 3 shows a variation. Here, the full packages 6 are stored superposed in seven levels and side by side in rows of ten. The mandrels are likewise spaced at the distance T, and the mandrels of one level are offset relative to the mandrels of an adjacent level by half the distance T/2.

According to the number of winding machines (for example five), the high-rise creel may have twice the number of storage mandrels at each level. When, as will be described further below, the full packages from one winding spindle each are temporarily stored in pairs side by side, the full packages from one row of winding machines, which comprises five winding machines, will lie side by side in one level. The full packages originating from the first winding machine occupy in this instance the first double position, the full packages from the second winding machine the second double position, etc.

The full packages which are, in the order of time, produced one after the other on a certain winding machine, are in this arrangement stored temporarily one on top of the other in a specific double position.

The process for handling of full packages in accordance with the present invention will now be described.

In the present embodiment, four packages are simultaneously produced on each of the winding spindles. Each doffer 5 is provided with two parallel mandrels 42 which are spaced from one another by the distance of the transport gauge T, and designed to receive half the number of the packages which are simultaneously produced on a winding spindle. Thus, in the present embodiment, each of the mandrels 42 receives two packages 6. This operation is described in detail, for example, in DE-OS 29 39 675, to which reference may be made for a further disclosure.

When a winding machine 2 requests the doffing of packages, the associated doffer 5 travels to the corresponding winding machine 2.1, 2.2, 2.3, 2.4, and calls for a free transport carriage 7.

Each transport carriage 7 has two transport mandrels 7.1 which are likewise spaced from one another by the distance T of the transport gauge. The called transport carriage 7 positions itself in the associated doffer position, so that the transport mandrels 7.1 of the carriage 7 are exactly coaxial with the mandrels 42 of the doffer still facing the winding machines.

The doffer receives on each of its two mandrels 42 respectively half of the full packages of a winding spindle, which is two, and then swings its mandrels by 180°, so that the doffer arms carrying the full packages are associated to and exactly aligned with the transport mandrels 7.1 of the waiting carriage 7. The rotation is effected about a vertical axis 48.

The doffer now pushes the two packages from each of its arms onto the transport mandrels of the carriage, which are likewise designed to receive two full packages.

The newly loaded transport carriage 7 now moves with its load on the forward track 30 of its conveying path 10.1, 10.2 up to the end 32 of one of the storage aisles 13, each of which is invariably associated to one of the service aisles 4.1, 4.2. There, the mandrels 7.1 of transport carriage 7 are directed into the storage aisle, with the transport carriage stopping in a position in which its mandrels can be brought into alignment with the mandrels 18 on elevator 17 of the servicing device 15. The elevator 17 on servicing device 15 then moves its mandrels 18 which are likewise spaced from one another by transport gauge T, to transport height I, II at which the transport carriage has arrived. Subsequently, the servicing device 15 moves along aisle 13 toward the transport carriage, until the mandrels 18 of servicing device 15 are aligned with the mandrels 7.1 of transport carriage 7, and takes over respectively two full packages.

The unloaded transport carriage travels now on return track segment 31 past the empty tube magazine 33.1 or 33.2, loads there the number of empty tubes required for a winding spindle, and is temporarily moved to a standby position on the portion of the return track segment 31 forming the cul-de-sac 34, until a doffer requests empty tubes.

The loaded servicing device 15 now travels in the direction of the other end 21 of storage aisle 13, with the elevator being moved to a height in which two juxtaposed mandrels of the high-rise creel 12 are unoccupied. Subsequently, a rotation by 90° occurs, so that the mandrels of servicing device 15 are in alignment with the free mandrels of the high-rise creel. The full packages are then delivered to the high-rise creel and temporarily stored.

The above functions repeat themselves continuously during a full twenty-four hour day. Unless the individual control station 8 and the packing station 9 are occupied, the individual conveyor platforms 20 are moved in position at one end 21 of storage aisle 13. Each of the individual conveyor platforms 20 possesses only one transport mandrel, however the dimensions of the conveyor platforms are selected such that the two mandrels of two closely adjoining individual conveyor platforms are likewise spaced from one another by the distance of transport gauge T.

In this position, the mandrels 18 of servicing devices 15 can be brought in alignment with the mandrels 26 of the two conveyor platforms 20.

To this end, the servicing device removes from two adjacent storage mandrels of one level respectively one full package, rotates by 90° in the direction of the individual conveyor platforms, and moves the mandrels 18 to a height which is identical with the height of the mandrels 26 of individual conveyor platforms 20. Thereafter, the two individual conveyor platforms 20 are started up from their stopped position and loaded at the same time, so that they can leave for the individual control station and the packing station.

In the drawings and specification, there has been set forth a preferred embodiment of the invention, and although specific terms are employed, they are used in a generic and descriptive sense only and not for purposes of limitation.

That which is claimed is:

1. A textile yarn processing apparatus for the continuous production of synthetic filament yarns comprising package winding means comprising a plurality of yarn winding machines arranged in parallel rows to define a service aisle therebetween, package storage means comprising a plurality of creels of substantial height and which are arranged parallel to each other to define a storage aisle therebetween, and with each creel having a plurality of storage mandrels arranged side by side in vertically spaced apart horizontal rows, and with the mandrels projecting toward said storage aisle, and servicing means movable along said storage aisle for delivering full packages to selected mandrels of a selected creel and for removing the same from such creels, package processing means comprising a receiving area positioned adjacent one of the ends of said storage aisle of said storage means, and a processing station spaced from said receiving area, doffer means adapted to move along said service aisle of said winding means for removing full packages from the winding machines and replacing said packages with empty yarn winding tubes, transport carriage means movable along a path of travel which includes said service aisle of said winding means and extends to a location adjacent one of the ends of said storage aisle of said storage means, and including transport mandrel means for receiving at least one full package from said doffing means and delivering the same to said servicing means of said storage means and for receiving at least one empty winding tube on its travel back to said service aisle and delivering the same to said doffer means, and said package processing means further comprising conveyor means for receiving full packages from said servicing means of said storage means at said receiving area of said processing means and conveying the same to said processing station.

2. The textile yarn processing apparatus as defined in claim 1 wherein said servicing means of said package storage means comprises transport mandrel means for receiving the full packages from said transport mandrel means of said carriage means, and means mounting said transport mandrel means of said servicing means to permit up and down movement in a vertical direction and rotation about a vertical axis so as to permit alignment with selected mandrels of said creels.

3. The textile yarn processing apparatus as defined in claim 2 wherein said yarn winding machines are arranged to define a plurality of service aisles, and wherein each service aisle includes a separate doffer means and a separate transport carriage means, with each separate transport carriage means including a separate conveyor track extending along the associated path of travel, and wherein said separate conveyor tracks are disposed at different elevations adjacent the associated end of said storage aisle of said storage means.

4. The textile yarn processing apparatus as defined in claim 2 wherein each of said winding machines includes a winding spindle which is adapted to receive an even number of winding tubes thereon, and wherein said transport mandrel means of said carriage means and said transport mandrel means of said servicing means of said storage means, each comprise at least one pair of mandrels, with each mandrel of each pair being adapted to receive one half the packages being wound on each of said winding spindles.

5. The textile yarn processing apparatus as defined in claim 4 wherein said pairs of mandrels of said carriage means and said servicing means have a common gauge.

6. The textile yarn processing apparatus as defined in claim 5 wherein said doffer means includes a pair of mandrels which are spaced apart by said common gauge.

7. The textile yarn processing apparatus as defined in claim 6 wherein said storage mandrels of said creels are equally spaced apart by said common gauge in said horizontal rows, and wherein the storage mandrels of vertically adjacent rows of said mandrels are offset by one half said common gauge.

8. The textile yarn processing apparatus as defined in claim 1 wherein said transport carriage means includes a conveyor track extending along said path of travel, and wherein said conveyor track comprises a closed loop which includes a forward track segment leading from said winding means to said storage means, and a return track segment leading from said storage means to said winding means.

9. The textile yarn processing apparatus as defined in claim 8 further comprising magazine means positioned along said return track segment of said conveyor track for supporting a plurality of empty winding tubes in vertically stacked, horizontal rows of tubes, and including means for transporting empty tubes from said magazine means and onto said transport mandrel means of said transport carriage means.

10. The textile yarn processing apparatus as defined in claim 8 wherein said service aisle includes a first end proximate said storage means and a second end remote from said storage means, and wherein said return track segment of said conveyor tracks extends as a cul-de-sac along said service aisle and which terminates adjacent said second end of said service aisle, and said forward track segment of said conveyor track includes a U-shaped portion along said service aisle.

11. The textile yarn processing apparatus as defined in claim 10 wherein said U-shaped portion includes a first branch leading directly to said storage means, a second branch which terminates adjacent said first end of said service aisle, and a reversing branch adjacent said second end of said service aisle interconnecting said first and second branches.

12. The textile yarn processing apparatus as defined in claim 11 further comprising switch means positioned along said service aisle for selectively interconnecting said return track segment with each of said first and second branches of said U-shaped portion of said forward track segment, and so as to permit transfer of said carriage means from said return segment to a selected one of said first and second branches.

13. The textile yarn processing apparatus as defined in claim 12 wherein said switch means comprises at least one turning switch for transferring said carriage means to said first branch while rotating the same about a vertical axis, and at least one parallel switch for transferring said carriage means to said second branch without rotation about a vertical axis.

14. The textile yarn processing apparatus as defined in claim 13 wherein a plurality of each of said turning switches and said parallel switches are positioned along said service aisle, with said turning switches and said parallel switches alternating along the service aisle.

15. The textile yarn processing apparatus as defined in claim 8 further comprising emergency elevator means for lifting packages onto said transport carriage means from a separate carriage or the like.

16. The textile yarn processing apparatus as defined in claim 15 wherein said emergency elevator means comprises an elevator which is positioned adjacent the end of said second branch of said forward track segment.

17. The textile yarn processing apparatus as defined in claim 1 wherein said conveyor means of said package processing means comprises a forward conveying track leading from said receiving area to said processing station and individual transport platforms mounted so as to be moveable along said forward conveyor track.

18. The textile yarn processing apparatus as defined in claim 17 wherein said conveyor means of said package processing means further comprises a return conveying track leading from said processing station back to said receiving area of said processing means and whereby packages of inferior quality may be returned to said servicing means of said storage means and then to selected storage mandrels of said creels.

19. The textile yarn processing apparatus as defined in claim 17 wherein each of said transport platforms includes a single mandrel which is oriented so as to extend horizontally toward and aligned with said storage aisle of said storage means when said transport platform is at said receiving area of said processing means.

20. The textile yarn processing apparatus as defined in claim 19, wherein said conveyor means of said package processing means comprises means for shifting the orientation of said individual transport platforms so as to rotate the same to a position wherein its associated mandrel is vertically disposed.

21. The textile yarn processing apparatus as defined in claim 1 wherein said transport carriage means comprises a plurality of transport carriages which are separately moveable along said path of travel.

22. The textile yarn processing apparatus as defined in claim 21 wherein said receiving area of said package processing means is positioned adjacent one of the ends of said storage aisle of said storage means, and said path of travel of said transport carriage means extends to a location adjacent the other of the ends of said storage aisle.

* * * * *